United States Patent [19]

Lauer

[11] 3,765,080

[45] Oct. 16, 1973

[54] APPARATUS AND METHOD FOR DEVELOPING WINDING COILS

[75] Inventor: Richard E. Lauer, Fort Wayne, Ind.

[73] Assignee: General Electric Company, Fort Wayne, Ind.

[22] Filed: July 6, 1971

[21] Appl. No.: 159,609

[52] U.S. Cl............... 29/596, 29/205 R, 29/605, 140/92.1, 242/7.03, 242/7.09
[51] Int. Cl.. H02k 15/00, H02k 15/14, H02k 15/16
[58] Field of Search.............. 29/596, 605, 205 R, 29/205 D; 140/92.1, 92.2; 242/7.03, 7.09

[56] References Cited
UNITED STATES PATENTS

| | | | |
|---|---|---|---|
| 3,514,837 | 6/1970 | Smith | 29/205 R |
| 3,579,791 | 5/1971 | Arnold | 29/205 R |
| 3,510,939 | 5/1970 | Smith | 29/605 |

*Primary Examiner*—Richard J. Herbst
*Assistant Examiner*—Carl E. Hall
*Attorney*—John M. Stoudt et al.

[57] ABSTRACT

Apparatus comprises winding assembly that includes a wire disposing or placing means (e.g., a flyer) that generates turns of wire about a forming means that preferably comprises two or more sections. The forming means or former assists in determining the configuration (e.g., size and shape) of a winding turn as it is being generated. Coil former is longitudinally shifted relative to the flyer after a predetermined number of turns of wire are generated about a first former stage and an intercoil winding segment is generated in a desired manner. During the shift, a predetermined number of winding turns are disposed upon a second stage of the former. In a preferred method, the coil former advances at a preselected speed greater than the winding turn feed rate while the intercoil winding segment is being generated. The former advances relatively slowly in order to secure the advantages associated with reduced machine part accelerations, velocities, and decelerations. The former includes a transition region that advances through a wire disposing plane associated with the flyer. This region includes a wire accommodating ledge or step. During development of the coils and generation of the intercoil segments, a lead is established between the segments and adjacent winding turns to facilitate the development of an accurate number of turns as well as the desired placement of wire. Advance or jump speed of the turn former is preselectively determined and controlled.

19 Claims, 17 Drawing Figures

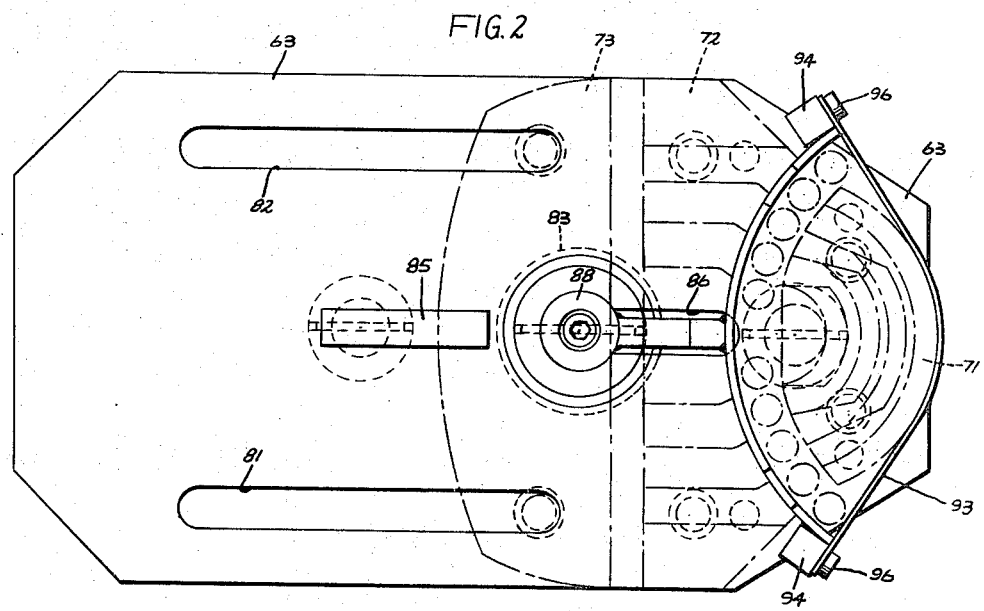
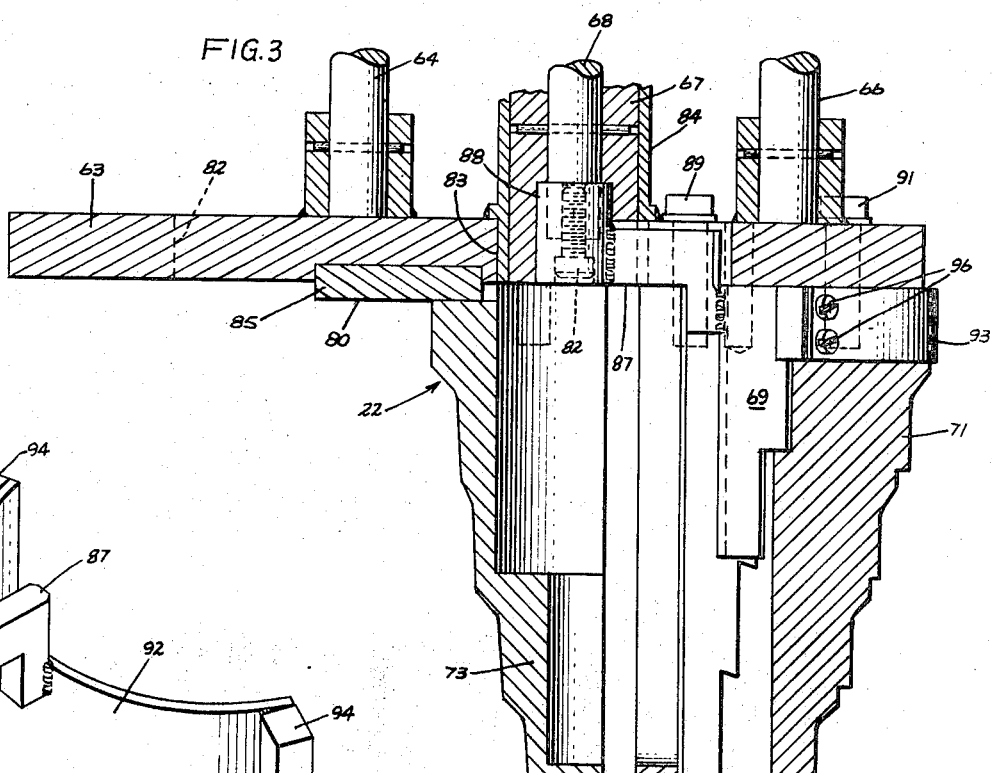
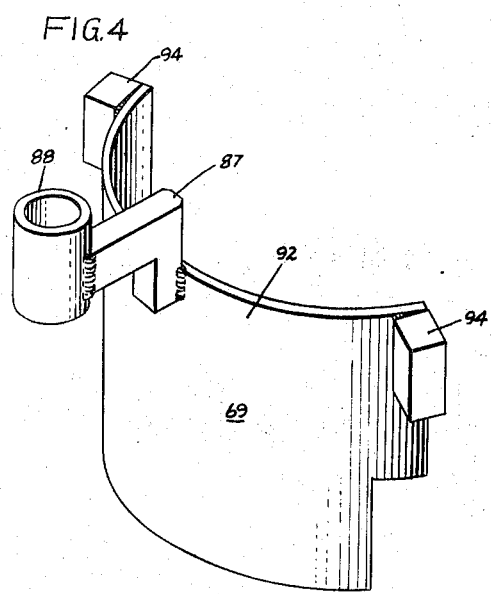

Patented Oct. 16, 1973
3,765,080
6 Sheets-Sheet 3
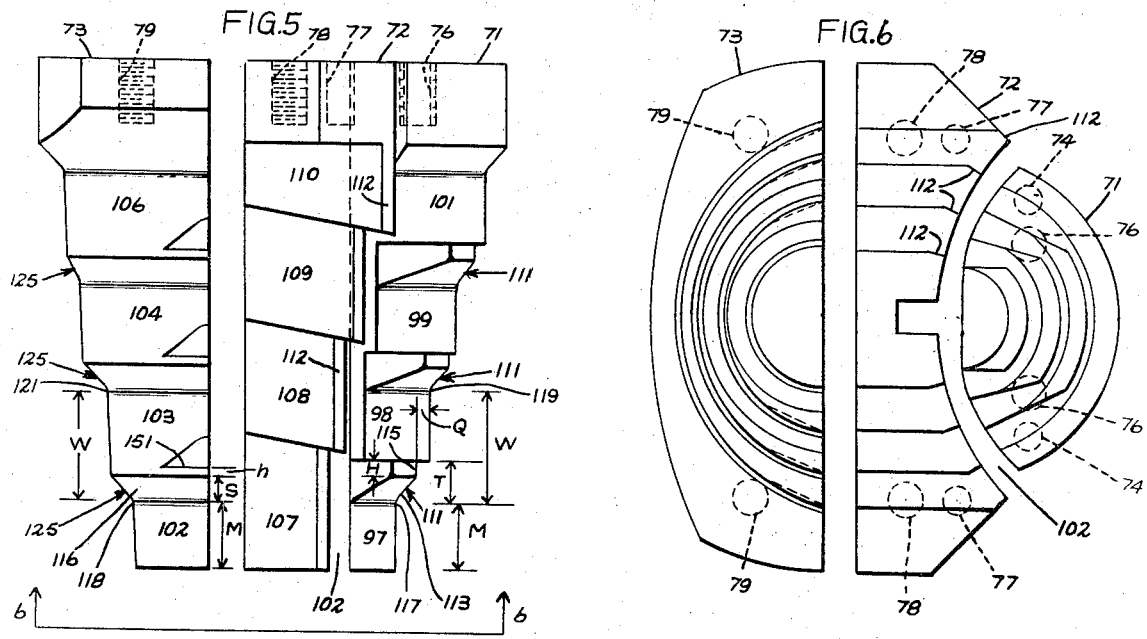
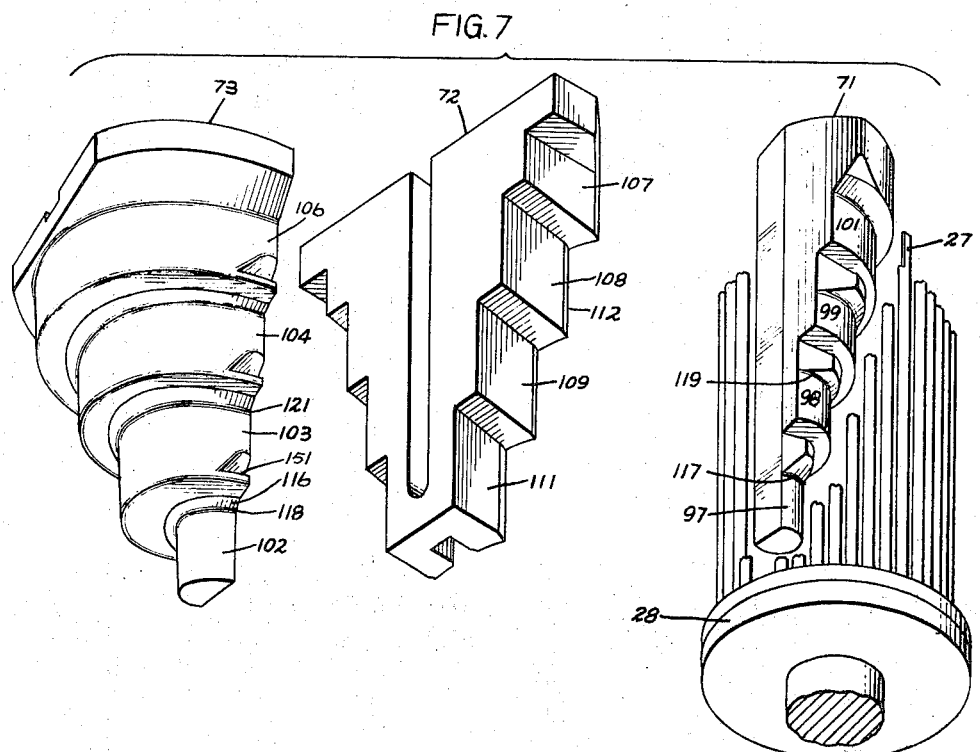
INVENTOR:
Richard E. Lauer,
BY Ralph E. Krisher Jr.
ATTORNEY.

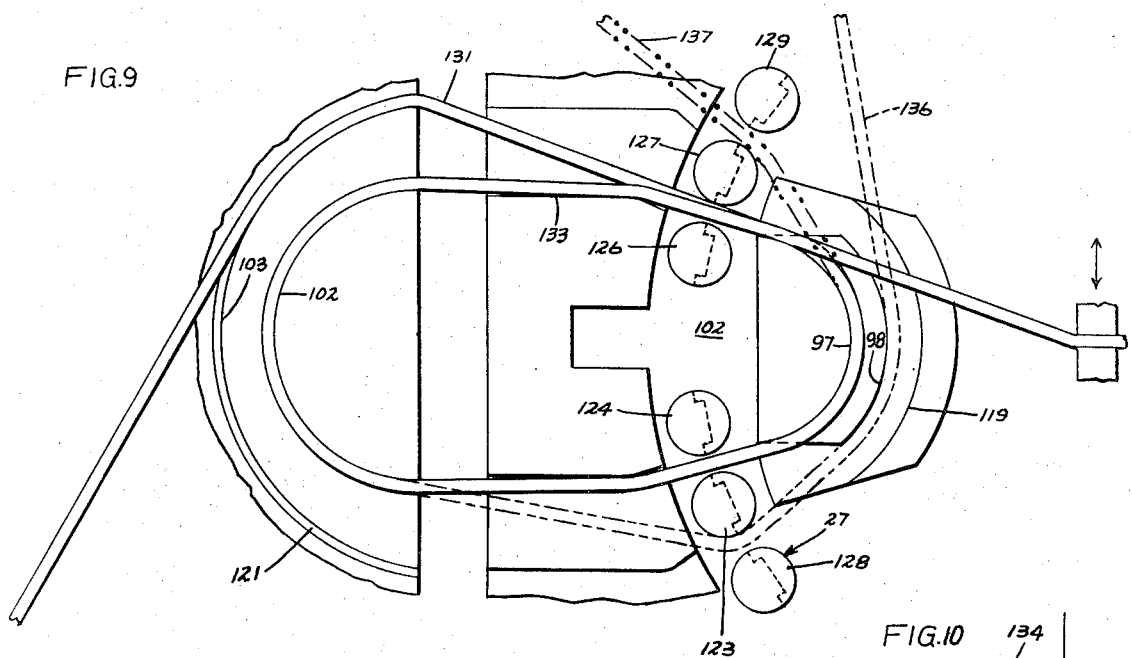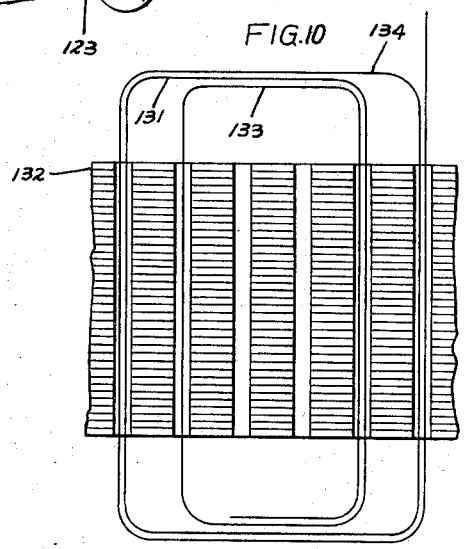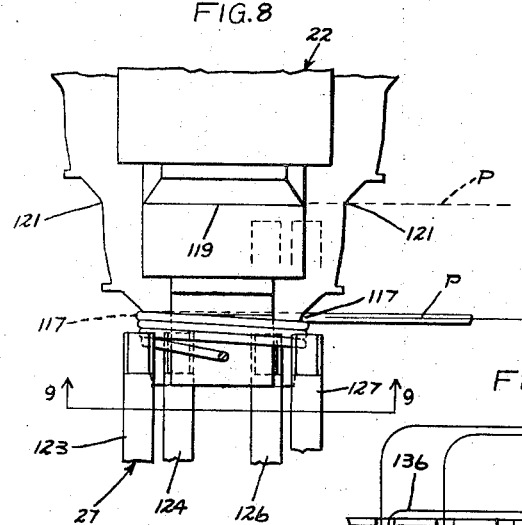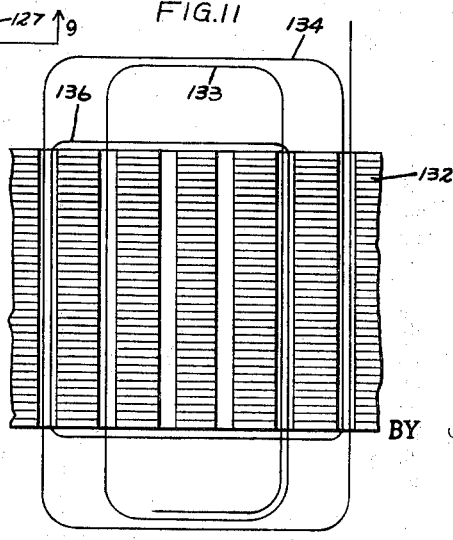

Patented Oct. 16, 1973
3,765,080
6 Sheets-Sheet 5
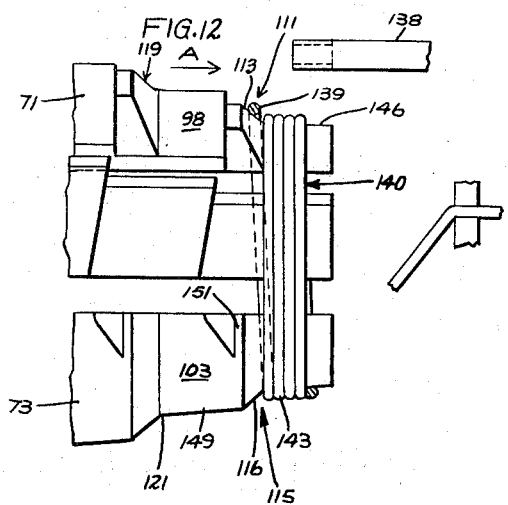
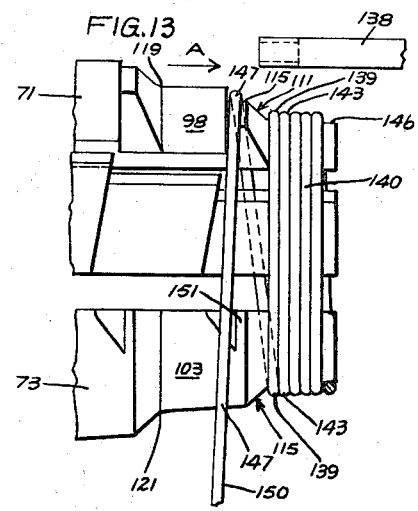
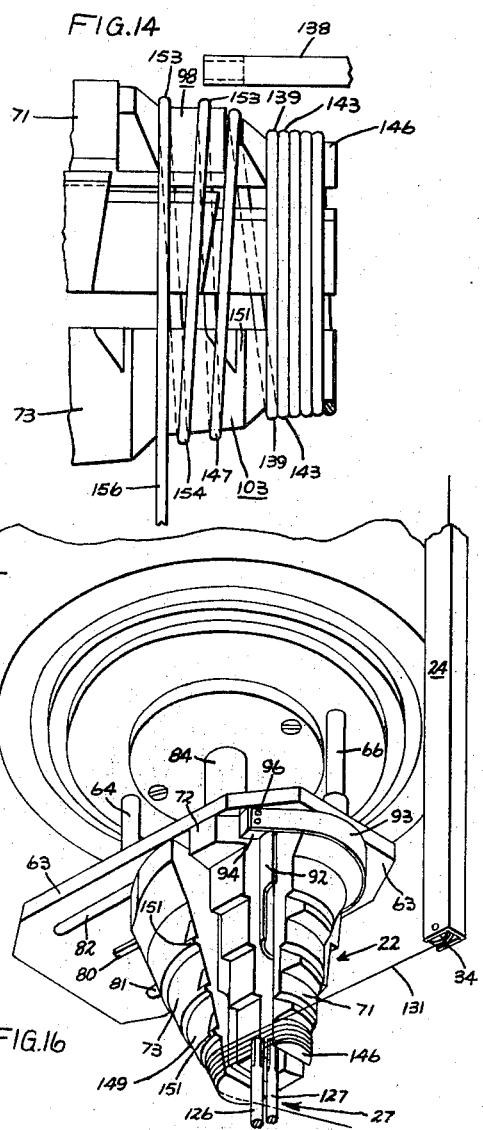
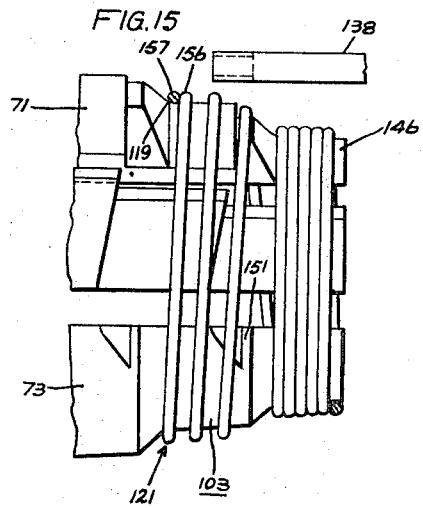
INVENTOR:
Richard E. Lauer,
BY Ralph E. Kusker Jr.
ATTORNEY.

INVENTOR:
Richard E. Lauer,
BY Ralph E. Krisher Jr.
ATTORNEY.

APPARATUS AND METHOD FOR DEVELOPING WINDING COILS

BACKGROUND OF THE INVENTION

The present invention relates generally to an improved method and improved apparatus for developing two or more interconnected coils having different configurations, for example different coil sizes or winding turn lengths per coil; and more particularly to apparatus and method for developing coils that may be used in an inductive device such as a dynamoelectric machine.

More specifically, the present invention relates to apparatus and methods for accurately developing two or more coils and intercoil winding segments at high speeds, e.g., at winding speeds in excess of 2000 r.p.m.; the coils then being utilized for example as the windings of an electromagnetic device such as a motor.

Approaches utilized heretofore for developing coils in electrical inductive or electromagnetic devices have included utilization of coil injection type machines as referred to for example in the Smith U.S. Pat. Nos; 3,510,939 and 3,514,837, both of which are assigned to the assignee of this application. The disclosures of these Smith patents are specifically incorporated herein by reference.

These Smith patents disclose, among other things, one approach that may be followed fo developing wound coils. With approaches as disclosed by Smith, as well as with other approaches, a first mode of relative movement of a wire disposing or placing means (such as a flyer) and a coil former or other suitable means is effected to develop a first coil. A second mode of relative movement is then effected in order to wind a second coil.

For example, in one type of apparatus, a flyer rotates about a one or more piece coil form or arbor and develops a coil comprising a plurality of turns of a predetermined size. Then, after a preselected number of turns have been developed to form the first coil, the winding form is shifted axially relative to the flyer within a relatively short transition interval, and the flyer continues to develop turns for a second coil. It will be understood that the wire generated from the flyer during this transition interval may subsequently be found and identified, even after placing the wound coils in a motor stator. This wire is usually identifiable as the wire interconnecting the adjacent coils in a coil group and is referred to herein as an intercoil winding segment. As will be better understood from the following description, the proper location of this winding segment between two different coils within a coil group in a preselected manner relative to the coil turn developing apparatus as well as to a stator core is of importance. Accordingly, skill and care is expended during the development of coil groups in an effort to assure the desired placement and location of the intercoil winding segments.

It is also desirable, from a standpoint of efficient utilization of machine and operator time, to operate a piece of winding equipment continuously and at as high a rate of speed as is consistent with satisfactory product quality during the development of a coil group. Thus, the longitudinal or axial movement between a coil form and a flyer is more desirably accomplished while the flyer continues to rotate at a fixed winding speed and develop turns of wire about the coil form at such speed. A review of prior apparatus and techniques has revealed that as winding speeds have been increased, the speed of this axial movement or "jump" of a coil form has been increased a commensurate amount. This increased coil form jump speed has been necessitated in order to correctly position the intercoil connecting turns in the desired manner.

It has now been discovered, however, that with winding speeds increased to be in excess of 2000 r.p.m., further increases in jump speed are not effective to consistently assure the desired placement of intercoil winding segments. Furthermore, even at speeds of about 2000 r.p.m., jump speeds and related machine part accelerations have approached sufficiently high levels to cause at least some concern that inertial forces acting on various machine parts are excessive.

Accordingly, it would be desirable to provide both a method and means for accomplishing the desired placement of an intercoil winding segment during the high speed development of coils and that could also be utilized even at reduced winding speeds so as to reduce the magnitude of acceleration of various machine parts and the inertial forces associated therewith.

In the case of "wind and shed" approaches, a winding form or arbor normally is comprised of at least two spaced apart portions between which coil receiving means are disposed to receive winding turns developed by turn placing means, e.g., a flyer. In these approaches, movement of the arbor relative to the flyer in other than the desired manner may result in the misplacement of an intercoil winding segment and may also result in the intercoil winding segment being broken as it is pulled across the coil receiving means. This is particularly true when the receiving means is in the form of a coil transfer magazine or other "pin" or "blade" type receiver. When wire breakage occurs during winding it is necessary to stop the winding equipment and "rethread" the wire along the desired wire path. Almost inevitably, the portion of a coil group wound prior to the break must be scrapped. Then, after salvaging previously wound coil groups and restarting the equipment, a special repair step must be subsequently performed to manually establish an interpole or intercoil-group connection. Thus, a loss of material as well as labor results from wire breakage.

Misplaced intercoil winding segments may also be broken during subsequent placement of the coil group into the slots of a stator core. This is especially evident in those cases where misplacement of an intercoil winding segment results in an attempt to accommodate a relatively short coil turn in a relatively wide expanse defined by two stator core slots. Even when the misplaced intercoil winding segment is not broken, the resultant short winding turn may be broken during subsequent operations, such as an end turn lacing operation. Even when breakage of a misplaced intercoil winding segment does not result, the tight winding turn resulting from a misplaced intercoil winding turn may cause a malfunction of subsequently utilized manufacturing equipment, lacing machines again being one type of such equipment.

In one piece of prior apparatus that has been examined, it has been determined that, at a 2000 r.p.m. winding speed, the winding former must jump and an intercoil winding segment be formed within a preselected 60 degrees of flyer rotation after the jump point has been reached in the development of a coil group. Thus the accuracy of the number of turns within a coil and thus coil group as well as proper intercoil winding segment placement depended, in the examined apparatus, upon the transmission of electrical signals, operation of solenoid and mechanical linkages, and acceleration-movement-deceleration of machine parts within 1/6 of a flyer revolution. Since the period of time, that elapses for 1/6 of a revolution (at a 2000 r.p.m. flyer speed) is only about 1/200 of a second, turn number accuracy has been difficult, if possible at all, to achieve. At increased flyer speeds, e.g., 3000 r.p.m., the time interval for jump would be about 1/300 of a second. For this and other reasons, one suggested approach has been to slow the speed of the flyer just prior to and during a jump. Difficulties and disadvantages of this approach are, however, self-evident.

SUMMARY OF THE INVENTION

Accordingly, it is a general object of the present invention to provide an improved method and apparatus of developing coil groups for installation in electrical inductive devices.

Another object of the present invention is to provide improved apparatus and method for accurately developing, at a high rate of speed, coil groups having at least two coils of different sizes and interconnected by an intercoil winding segment positioned in a desired fashion relative to the winding equipment and coils within a given coil group.

It is another more specific object of the present invention to provide an improved coil developing method and apparatus that results in a controlled mode of relative movement between a turn former and winding placing means while an intercoil winding segment is being accurately generated at the same winding turn rate as the winding turn rate during coil development.

It is yet another object of the present invention to provide a coil developing method and apparatus that may be utilized to assist in the reduction of inertial forces during a coil forming operation.

In carrying out the invention in one form, an end of wire is held so that coils may be developed by a winding assembly. This assembly includes a wire disposing or placing means (a flyer in a preferred embodiment) that generates turns of wire about a winding turn forming means that preferably comprises two or more sections. This forming means or "former" is useful in assisting to determine the general configuration, e.g., size and shape, of wire turns (e.g., coil turns) as they are being generated. After a predetermined number of turns of wire are generated about a first step or stage when the forming means is a stepped arbor or turn former, the coil turn former is longitudinally shifted relative to the flyer so that an intercoil winding segment is generated in a desired manner relative to the turn former and other parts of the apparatus. During the shift the flyer continues to rotate at a substantially fixed speed of rotation, and a predetermined number of winding turns are disposed upon a second step of the turn former. When more than two coils are desired for a given coil group, still additional coils and intercoil winding segments may be placed about the turn former in this same manner.

In the practice of one preferred form of method embodying the invention, the turn former is advanced while the intercoil winding segment is being generated. The turn former advances at a preselected speed greater than the winding turn feed or advance rate as determined by multiplying the cross-sectional dimension (in the direction of advance) of the wire times the turn generation speed, in turns per minute. When a rotating flyer and stationary turn former are utilized, the r.p.m. of the flyer will be the same as the turn generation speed. Although the advance of the turn former may be effected greatly in excess of this speed, it is preferred to advance the form as slow as possible in order to secure the advantages associated with reduced machine part accelerations, velocities, and decelerations.

In the preferred embodiment, the turn former includes a turn former transition region that advances through a wire disposing plane associated with the flyer. The transition region preferably includes a wire accommodating ledge or step. The intercoil winding segment is then generated from the vicinity of this ledge to another stage of another winding former section.

In the event that the intercoil connecting segment misses the ledge or is dislodged therefrom, the winding tension pulls the intercoil segment of wire into the previously developed coil. During development of the coils and generation of the intercoil segments, a lead is established between the segments and adjacent winding turns and this facilitates the development of an accurate number of turns as well as the desired placement of wire. Acceleration and deceleration of the turn former is accomplished while coil turns rather than intercoil winding segments are being generated.

In a preferred form of apparatus, the advance or jump speed of the turn former is preselectively determined and controlled by means which, in one exemplification, comprises a fluid pressure responsive device in the form of a double acting fluid cylinder that operates under a differentially applied fluid pressure.

BRIEF DESCRIPTION OF THE DRAWINGS

The subject matter which I regard as my invention is particularly pointed out and distinctly claimed in the concluding portion of the specification. The invention itself, however, together with further objects and advantages thereeof, may be best understood by reference to the following description taken in conjunction with the accompanying drawings wherein like reference numerals have been utilized to denote like parts and in which:

FIG. 2 is a bottom plan view of a coil former support plate utilized in the FIG. 1 apparatus and illustrates, with broken outlines, relative positions of a coil former and other parts;

FIG. 3 is a side elevation, with parts broken away and parts in section, of the winding former support plate, winding former, and stripper mechanism of the FIG. 1 apparatus;

FIG. 4 is a perspective view of the stripper of FIG. 3;

FIG. 5 is a side elevation of the coil former depicted in the preceding FIGURES;

FIG. 6 is a view looking in the direction of the arrows 6—6 in FIG. 5;

FIG. 7 is an exploded perspective view of the coil former and a transfer magazine shown in the preceding FIGURES;

FIG. 8 is a side elevation showing parts of the coil former and some of the pins of the coil transfer magazine of FIG. 1 with winding turns being generated about the coil former;

FIG. 9 is an enlarged view taken generally along the lines 9—9 of FIG. 8 with the complete coil former being represented with parts broken away, to illustrate desirable and undesirable placement of an intercoil winding segment relative to the coil former and other apparatus parts;

FIG. 10 is a schematic representation of a stator core having two winding coils accommodated in slots thereof to illustrate the desired arrangement of a winding having an intercoil winding segment positioned in a preferred manner;

FIG. 11 is a view similar to FIG. 10 to illustrate the occurrence of an undesirably formed intercoil winding segment;

FIGS. 12, 13, 14, and 15 are views of the winding former of FIG. 5 (oriented 90 degrees for purposes of illustration) illustrating the development of an intercoil winding segment in a desired fashion;

FIG. 16 is a perspective view illustrating the relationship of a winding disposing means in the form of a flyer, a coil former, and two of the pins of a winding receiver.

DESCRIPTION OF THE PREFERRED EMBODIMENT

Figure 1:
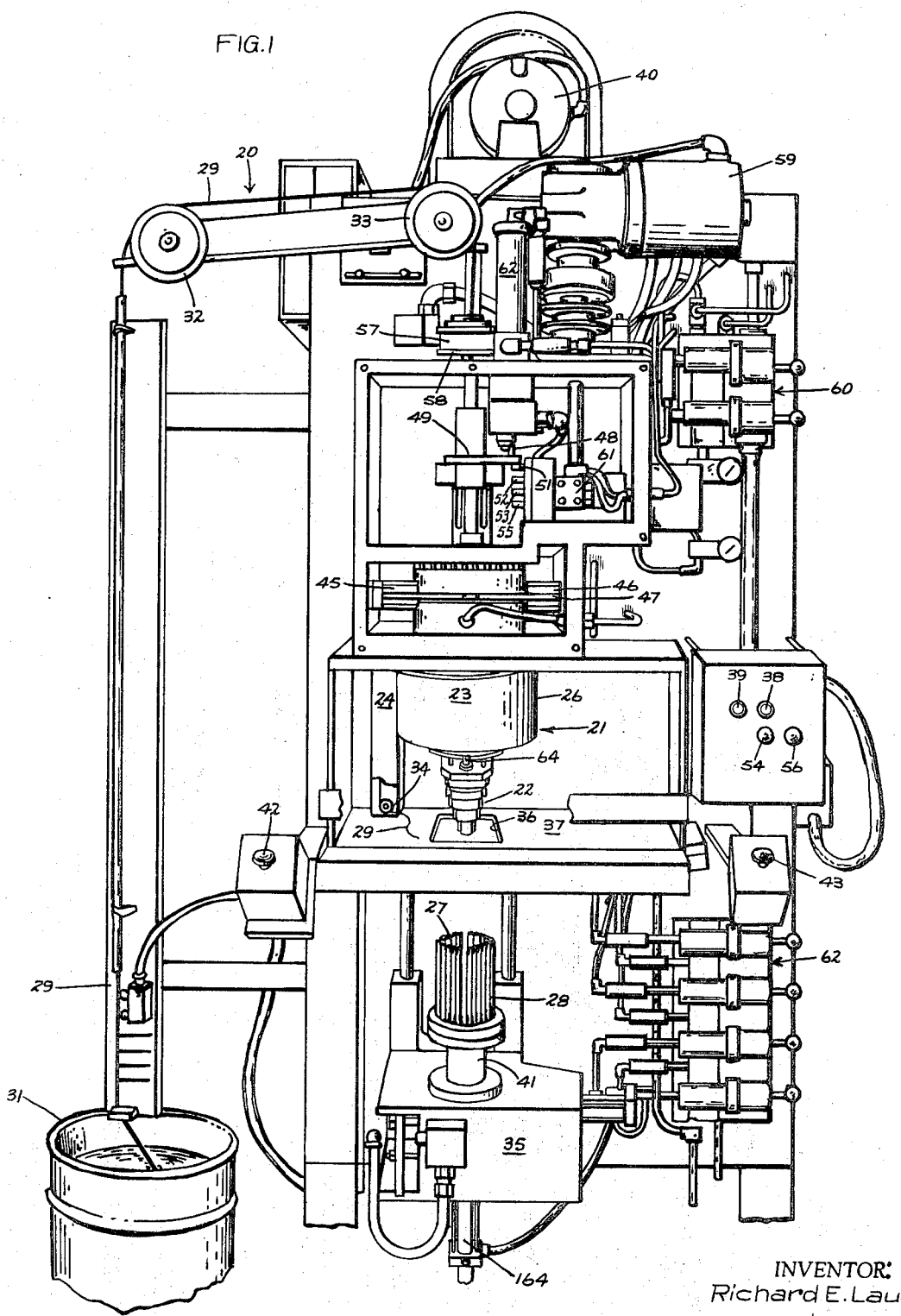
FIG. 1 is a front pictorial view providing a perspective type illustration of apparatus embodying the invention in a preferred form and which may be utilized in the practice of the invention in a preferred form.

Referring again to the drawings and more particularly to FIG. 1; there is illustrated apparatus 20 somewhat similar in outward appearance to the apparatus shown in the commonly assigned co-pending application Ser. No. 130,399 of Dallas F. Smith and Richard B. Arnold that was filed Apr. 1, 1971. The entire disclosure of said co-pending application Ser. No. 130,399 is specifically incorporated herein by reference.

The apparatus 20 embodies the invention in a preferred form and may be utilized in the practice of a preferred form of my invention. By way of general description, the apparatus includes a winding assembly or head 21 that is a winding turn generating assembly, and includes a coil or turn former generally denoted by the reference numeral 22 and a winding disposing or placing means illustrated in the form of a flyer 23 that in turn includes a flyer arm 24 secured to a rotating drum 26.

During operation of the apparatus 20 the flyer generates winding turns about the turn former 22. The winding so developed comprises two or more coils that, taken together, comprise a coil group. In the development of a winding, after a predetermined number of turns have been generated and a first coil developed, the turn former 22 advances longitudinally or axially relative to the flyer, an intercoil winding segment is generated, and a second coil having a size different than the first coil is developed. Preferably, at least some of the winding turns are shed into a winding receiver, e.g., between selected ones of the pins 27 of the coil transfer magazine 28. A more detailed description of this operation of the illustrated apparatus and the structure of the coil former and coil transfer magazine will be presented hereinafter in connection with the description of FIGS. 2 through 9. Additional description of a wind and shed approach is also contained in the referenced Smith patents.

Still referring to FIG. 1, a brief general description of the operation of the apparatus 20 and various structural parts thereof will now be presented. Wire 29 is supplied from any suitable or convenient source such as the spooled wire supply 31 through appropriate guides shown as wire pulleys 32, 33 and through a not illustrated wire passage to the flyer 23. During operation, the wire is fed about a wire pulley 34 carried by the flyer arm 24 and is then generated as winding turns about the coil former 22.

In initially preparing the apparatus 20 for operation, a panel on the rear of the apparatus is opened and a series of counters and switches are set, as will be understood by persons skilled in the art, in order to program the apparatus for the desired mode or sequence of operation. For example, switches would be set to program the machine for two pole, four pole, or six pole operation, and a predetermined total number of winding turns for each pole. Selector switches or counters would also be set to indicate the desired predetermined number of turns in each coil of each coil group; a coil group normally then being wound in a sub-cycle of operation of the apparatus 20 and later being utilized as one pole of a main or auxiliary motor winding. Also programmed into the machine would be the number of turns to be wound at the beginning of a first sub-cycle before a wire clamp is opened, for example as taught in Smith U.S. Pat. No. 3,514,837.

As has been done before, another counter would also be set to the total number of turns that are to be wound for a given coil group. This setting is utilized, with logic circuitry, (again as will be understood by persons skilled in the art) to de-energize a high speed flyer drive motor, energize a standard caliper disc brake on the flyer mechanism, de-energize the disc brake, and engage the clutch for a low speed flyer drive motor which would then driv the flyer to a final turn count for the coil group, after which the low speed motor will be declutched and the brake is energized to stop the apparatus.

In preparing the apparatus 20 for operation, the wire 29 is fed through the opening 36 in the deck or table top 37 of the apparatus 20. With the electrical supply to the apparatus 20 disconnected (for example by pushing the stop button 38), a not shown wire clamp supported from the deck 37 will be open. The free end of the wire 29 is then manually held in place and clamped by the wire clamp when the electrical supply is again connected by pushing the electricity "on" button 39. At this time, a wire cutter adjacent the clamp will also be energized and snip off any excess wire extending beyond the cutter.

Thereafter, the magazine 28 is positioned over a locating pin carried by the magazine pedestal 41 while a foot or manually operated switch is actuated. Upon release of such switch, the magazine 28 will be locked to the pedestal 41. Thereafter, a not shown protective cover will be closed in order to isolate an operator from the winding assembly 21 during machine operation.

To commence operation of the apparatus 20, two "machine cycle start" buttons 42, 43 are depressed and thereupon the magazine pedestal 41 and base 35 is raised upwardly as viewed in FIG. 1 by the rod of a pneumatic cylinder. The magazine raised until a not shown limit switch is tripped by the base 40 and thereupon the magazine is locked at a desired height relative to the deck 37 of the apparatus. The relative position of the turn former 22 and magazine 28 at this time and during the beginning of a machine sub-cycle is illustrated in FIG. 8.

Referring again to FIG. 1, after the magazine travel limit switch has been tripped, the conventional caliper type disc brakes 45, 46 are released from brake disc 47 on the flyer drive mechanism and the flyer is free to rotate. Upon brake release, the flyer commences to rotate at a high speed under the influence of the high speed motor 40 and generate winding turns of a first coil about the former 22. Then, as a predetermined number of turns in a first coil are developed about the coil former, the interposer pin 51 is retracted and the rod 48 of a coil former drive cylinder (interconnected with a drive plate 49) drives the plate 49 into engagement with an interposer pin 52. At this time, the coil former 22 jumps or advances longitudinally or axially relative to the flyer 23 and the magazine 28. During advance, continuously rotating flyer 23 generates, at a constant winding turn rate, the final part of a first coil, an intercoil winding segment, and the initial part of a second coil. As viewed in FIG. 1, the jump of coil former 21 would be vertically downward.

This development of different coils in a coil group will continue, with succeeding ones of the interposer pins 52, 53 being retracted to permit advancement of the coil former relative to the flyer 23 and magazine 28 until the control section for the apparatus stops the apparatus 20 upon completion of a coil group and thus one sub-cycle of the apparatus. In order to stop the flyer, the high speed motor 40 is de-energized, the caliper brakes 45, 46 are energized, and the low speed motor 59 is engaged to drive the flyer drive by engagement of a clutch to drive the flyer at a reduced speed during the development of the last few turns of the coils in a coil group.

Thereafter, pneumatic cylinder 61 retracts and pulls all of the remaining interposer pins so that cylinder 62, through rod 48, drives the plate 49 against stop bar 55. At this time, the rod of another cylinder is extended and, through suitable linkage (as shown and described for example in the above referenced Smith patents) operates a winding turn stripper nested between sections of the coil former 22. After the stripper advances (further details of the stripper are presented later herein in a discussion of FIGS. 2 through 4), all of the winding turns of the coil group are positioned between selected pairs of the pins 27 of the magazine 28.

While the stripper is advanced, the clamp supported under table 37 clamps the wire 29, the piston of cylinder 62 is retracted, and the coil former 22 is raised to the position shown in FIG. 1. The stripper cylinder then retracts, and cylinder 61 extends the rod thereof to reset the interposer pins 51—53. Thereafter, the magazine 28 is indexed a preselected number of degrees determined by the number of poles or coil groups that are to be wound, the coil former drive plate 49 is urged against the first interposer pin 51, and another coil group is wound in the manner described above. Another apparatus sub-cycle is then executed in the above described fashion. it will be appreciated, that during operation of the apparatus, the flyer may rotate in a clockwise or counterclockwise direction for any given coil group (or, when desired, for specific sections of a coil). This procedure is now known in the art and the apparatus 20 is equipped with a pair of lights 54, 56 that indicate the counterclockwise or clockwise direction of rotation of the flyer.

After a predetermined number of coil groups have been developed about the winding former and disposed in the coil transfer magazine 28, the wire 29 is cut adjacent to the clamp under table 37, the coil former returns to its home or dwell position shown in FIG. 1; the coil transfer magazine 28 is lowered to the position shown in FIG. 1; and the transfer magazine 28 is removed from the apparatus 20. Subsequently, the coils retained in transfer magazine 28 may be injected or otherwise placed in the slots of a stator core. An empty coil transfer magazine is then loaded onto the machine and another machine cycle is commenced.

Various other structural elements shown in FIG. 1 include two banks of valves 60, 62 and various cylinders, fluid lines, and gauges that will be descirbed in more detail hereinafter in connection with FIG. 17.

With reference now to FIGS. 2 through 11, the coil former 22 is supported on a coil former support mechanism that includes a plate 63. The plate 63 is locked against rotation relative to the apparatus frame by a pair of dowel pins 64, 66 received by a stationary part of the apparatus. A bushing 67, secured to a stripper drive rod 68 permits relative movement between the stripper 69 and coil former 22.

As best revealed in FIGS. 3, 5 through 7, and 9, the illustrated coil former 22 has three sections that have been fabricated as separate parts in order to facilitate adjustment of the coil former so as to permit the development of coil groups for various stack heights of stator cores. As shown, the coil former includes a first section 71 (generally corresponding to the "top" section referred to in the above identified Smith patents), a center section 72, and a third section 73. The configuration of the three sections 71, 72, 73 is clearly shown in FIGS. 5 through 7.

Inspection of FIGS. 5 and 6 reveals that the section 71 is provided with a pair of dowel pin receiving holes 74 that receive dowel pins carried by the plate 63, and with a pair of threaded passageways 76 that receive fasteners such as screws 91. These fasteners secure the section 71 to the plate 63. Similarly, dowel pin receiving passages 77 and threaded passages 78 are provided in the central section 72. Screws 89 (see FIG. 3) secure the section 78 to plate 63. The adjustable section 73 of the former 22 is provided as illustrated with threaded passageways 79 into which bolts may be screwed to adjustably secure the section 73 to the plate 63 and a key 80 and keyway 95 keep these parts aligned.

Referring now to FIG. 2, the plate 63 is provided with a pair of slots 81, 82 along which the bolts received by section 73 may slide so as to adjust the position of section 73 relative to the sections 71, 72 of the winding former. In addition, the plate 63 is provided with an opening 83 in which the former or arbor drive tube 84 is secured, as by welding, to plate 63.

The stripper drive rod bushing 67 may slide within the drive tube 84, while the stripper actuating arm 87 is fastened to the drive rod 68 by means of the stripper connector section 88 and bolt 82.

During operation of the apparatus 20, at the end of each machine sub-cycle, the stripper drive rod 68 is driven axially relative to the tube 84 and the stripper moves downwardly relative to the plate 63 and coil former 22 as viewed in FIG. 3. At this time, the stripper body 92 forces the side turn portions of any coils remaining on the steps or stages of the turn former sections downwardly into a coil receiving means (such as magazine 28). A strap 93, fastened to the stripper body by means of fastener blocks 94 and screws 96, insures that the wire extending from the flyer is positioned to be retained by the previously mentioned clamping means.

With emphasis now on FIGS. 5 through 7, the turn former section 71 has a plurality of stages or steps 97, 98, 99 and 101. The adjustable section 73 on the other hand is provided with longitudinally extending stages or steps 102, 103, 104, and 106 with these steps corresponding, respectively, to the longitudinally extending steps formed on the section 71 as will be best appreciated from examining FIG. 5. The center section on the other hand is provided with relieved surfaces 107 through 110 that, during the development of coils about the coil former 22, are generally out of the path of the developing coil turns. The center section 72 does, however, include surfaces generally denoted by the numeral 112 that are tangent with respective ones of the steps 97 etc. of section 71.

The transition regions 111 separating adjacent steps of the turn former section 71 is illustrated as including a surface 113 inclined from the winding turn formation region 117 and terminating in a longitudinally extending winding turn or wire accommodating step or stage 115. The longitudinal extent of this transition region is indicated by the letter T and the longitudinal extent of the step 115 is represented by the letter H. For reasons to be later presented, the distance H is preferably at least as great as the maximum size of wire to be accommodated thereby, such size being measured as the cross-sectional dimension of the wire along the longitudinal extent of step or ledge 115. The amount of offset or the Q distance shown in FIG. 5 of the step 115 relative to the step 98, may be widely varied but again, preferably, is at least as great or slightly greater than the maximum lateral dimension of wire to be accommodated on step 115. This lateral wire dimension would be the wire cross-sectional dimension measure in the direction of the illustrated Q dimension. The sloping or tapered surface portion 113 advantageously, as will be alter described, provides means for shedding a winding turn disposed thereagainst, under tension, toward the winding turn formation region 117.

The transition regions 125 of the coil former section 73 comprises a continuously tapering section or surface region 116 interconnecting the steps 102 and 103. The longitudinal extent S of the transition section 125 is less than the longitudinal extent T of transition regions 111. The distances M, between the free extremities of the sections 71, 73 and winding turn formation regions 117, 118 are (within manufacturing tolerances) the same. This also is the case of the dimensions W between adjacent winding turn forming regions such as regions 117, 119 and regions 118, 121.

During the generation of winding turns about the first steps 97, 102; the flyer will place wire approximately at the regions 117, 118. Then, after a desired number of turns have been developed about the first step 97, 102 (which may advantageously be tapered slightly to facilitate the shedding of turns therefrom in the manner now known in the art), the winding or coil former 22 is advanced or jumped to a position such that the turns of another coil may be generated approximately at the winding turn formation regions 119, 121. It should be noted at this point, that the coil former 22 could remain stationary while the flyer is moved to effect the desired relative jump, but that less complicated machinery will probably result by jumping the coil former.

During the relative jump, it is desirable for the wire turn being placed to move between adjacent steps on the former in a predetermined manner. This predetermined manner is attained in the preferred embodiment and will be better appreciated by now also referring to FIGS. 7-11. As will be appreciated from FIG. 7, as the coil former 22 is advanced relative to the flyer it also is advanced relative to the transfer magazine 28 with pins 27 of the transfer magazine being telescopically received within a gap 102 between the sections 71, 72. This relationship is illustrated in FIGS. 7, 8 and 9. The tips of the pins 27 are, as revealed in FIG. 8, initially located relative to the winding turn disposing plane P of the flyer so that the flyer places coil turns of wire about the winding former 22 above the free ends of the pins 27. Then, as succeeding turns of wire in a coil are generated by the flyer, the previously generated turns are shed downwardly as viewed in FIG. 8 between preselected ones of the winding pins 123, 124, 126, 127 as illustrated. Upon completion of the formation of a first coil, the former 22 or other forming means being utilized is advanced downwardly relative to the plane P and the pins 27 so that the relative axial position of the former 22, pins 27, and plane P, are as shown in dotted outline form in FIG. 8. During this advance, the final portion of a first coil, an intercoil winding segment, and an initial portion of a second coil are generated by the flyer.

Reference now is made to FIG. 9, which is an enlarged bottom plan view that would approximately correspond to a view taken generally along the lines 9—9 of FIG. 8. In this view, as well as FIG. 8, the identical pins 27 have been separately numbered for purposes of description. During the development of a first coil about the steps 97, 102, the winding turns are positioned, while being generated, for being shed into the gap between adjacent pins 123, 124 and into the gap between adjacent pins 126, 127. Then, when a coil of a next larger size is being developed on steps 98, 103, the turns of the larger coil will be shed into the gaps between the pins 127, 129 and pins 123, 128.

Assuming that coils have been developed with the intercoil winding segment generated in the desired fashion, the coils, when subsequently placed in the slots of a stator core, will generally appear as schematically illustrated in FIG. 10. In this FIGURE, the numeral 133 denotes a first coil which is actuality may comprise up to forty or more winding turns and the numeral 134 denotes a winding coil of a larger size, the coil 134 again, in actual practice, normally comprising a plurality of winding turns. When it is desired for the coils 133 and 134 to be serially connected, it will be appreciated that it is of great convenience for the intercoil winding segment 131, that is, the winding segment connecting the coils 133 and 134, to be disposed as illustrated in FIG. 10. Thus, the segment 131 should be developed with a sufficient overall length so that the winding end turns all will be positioned in generally the same vicinity as shown in FIG. 10.

On the other hand, when the intercoil winding segment is misplaced or developed improperly (as would be indicated by the dashed line wire segments 136, 137 in FIG. 9), the relative positions of the coils 133, 134 and intercoil winding segments 136 for example would be as shown in FIG. 11. In the event that an intercoil winding segment is developed with a configuration as illustrated in FIG. 11, even if the windings can be placed in the slots of the core 132 without breaking the intercoil winding segment (again assuming the intercoil winding segment has not been broken while being developed on the winding former 22), it is difficult, if not impossible, to lace or tie together all of the winding end turns of the coils 133, 134 and intercoil winding segments.

An even greater problem can arise, however, if the intercoil winding segment is generated as illustrated by the broken line wire segments 136, 137 in FIG. 9. More specifically, the segments 136, 137 would probably be broken (this depending also on tensile strength of the wire and winding tension, among other things) as they were pulled across the pins 123 or 127. Were this to occur, the winding turns previously developed for the illustrated coil 133 would be scrapped and other additional losses would result as discussed hereinabove.

Prior to development of the exemplified apparatus, and preferred method, misplacement of an intercoil winding segment has produced this result.

However, if my teachings are followed and the intercoil winding segments are consistently generated in the desired manner, even at winding speeds of 3000 r.p.m., the desirable intercoil winding segment configuration illustrated in FIG. 10 will consistently result. Furthermore, the turn number accuracy will be consistent and reduced inertial forces may be achieved even at lower as well as higher winding speeds.

In order to better appreciate the practice of a preferred method, an additional description of the coil or winding former 22 and relative longitudinal movement between the former and flyer will now be presented in connection with FIGS. 12 through 16 as well as FIGS. 8 through 9.

It will now be clear that, during operation of the apparatus 20 in the development of one coil of a given coil group, the transfer magazine 28 remains stationary in a coil turn receiving position while the flyer 21 rotates about a fixed axis of revolution. Looking now at FIG. 16, it will be appreciated that as the flyer develops winding turns, turns are shed from the coil former between selected adjacent ones of the pins of the coil receiving magazine. FIG. 8 also illustrates this sequence as previously discussed.

With reference to FIGS. 12 through 15, the relative jump between the coil former and flyer will be described. It should first be noted that the structure illustrated in FIGS. 12 through 15 is the same as the structure shown in the other views of the drawings but that, as compared to FIG. 8, the structure has been oriented 90° in FIGS. 12 through 15 to facilitate the description thereof. Furthermore no attempt has been made to illustrate an exact number of turns in any coil of a coil group such as might be developed in practice; it again being noted that for any given motor design the number of turns within a coil as well as the number of coils in a given coil group may be varied as required by the motor design. In FIG. 12, the position of the free end of a magazine pin or blade 138 relative to the coil former 22 is as would occur just as a jump was initiated while the final portion of the coil 140 is being generated. It will be appreciated from FIG. 12 that the final winding turn 139 for coil 140 (by virtue of the movement of the coil former 122 in the direction of the arrow A) is placed upon the sloping or tapered surface 113 of the former section 71. As the flyer continues to move, the winding turn 139 will also be disposed against the tapered surface 116 of the coil former section 73. The winding tension then pulls the winding turn 139 into proximity with the winding turn formation regions 117, 118. This is shown in FIGS. 13. While the flyer continues to rotate, the former 22 continues to advance in the direction of the arrow A, and as the next turn 147 of wire is generated (see FIG. 13), the turn 147 will be disposed on the ledge or step 115 of the transition region 111, and be retained thereon.

As will be apparent from subsequent description, the portion of the coil turn 147 disposed upon the step 115 will be grouped with the coil 140. The portion 150 of this segment however, will be placed with the next larger coil and, thus, turn 147 will establish an intercoil winding segment. To assist in retaining portion 150 of turn 147 on step 103 of former section 73, I have provided a hook 151 having a width h (see FIG. 5). Since the distance M plus S plus h is less than the distance M plus T, any turn positioned on ledge 115 such as turn 147, would have the later generated portion thereof disposed on step 103 of former section 73, even if a lead were not being generated due to advancement of the former 22 relative to the flyer. With a lead as shown, the importance of the amount of difference between the longitudinal extent of transition regions 111 and 115 is, however, reduced. With continued relative movement of the former 22, the intitial portion of a second coil 153 is formed with a lead on steps 98, 103 as shown in FIG. 14. Thereafter, turns 156, 157 are generated adjacent the winding turn formation regions 119, 121 as shown in FIG. 15.

It will now be appreciated, that since the former 22 is moved axially at a speed greater than the winding turn feed rate, the coil turns generated during the jump for former 22 will be spaced apart and established a lead, e.g., like the threads of a screw. However, as the flyer continues to rotate about the former 22 after the jump, as shown in FIG. 15, winding turns will be generated in closely spaced, shedding relationship. With this relationship, each turn, as it is being developed, will force the next previously generated turn toward the free extremity of the winding former. To conclude this portion of the description, it should be noted that the winding turn feed or advance rate is defined as the product, in inches or feet per minute, of the flyer speed (or turn generation rate) in revolutions or turns per minute, times the diameter or other cross-sectional dimension of the wire. Winding turn rate on the other hand equals flyer r.p.m.

The means for advancing the coil former 22 at a preselected rate of speed will now be described in connection with FIG. 17, it being noted that, in order to establish a lead between adjacent turns, it is necessary to advance the former 22 at a speed in excess of the winding turn feed rate. For the exemplified arrangement operating at 3000 r.p.m. with 0.0253 inch diameter wire, the winding turn feed rate is 75.9 inches per minute. Thus, the speed of advance of the former 22 is in excess of this speed and preferably, is at least about 90 inches per minute.

Figure 17:
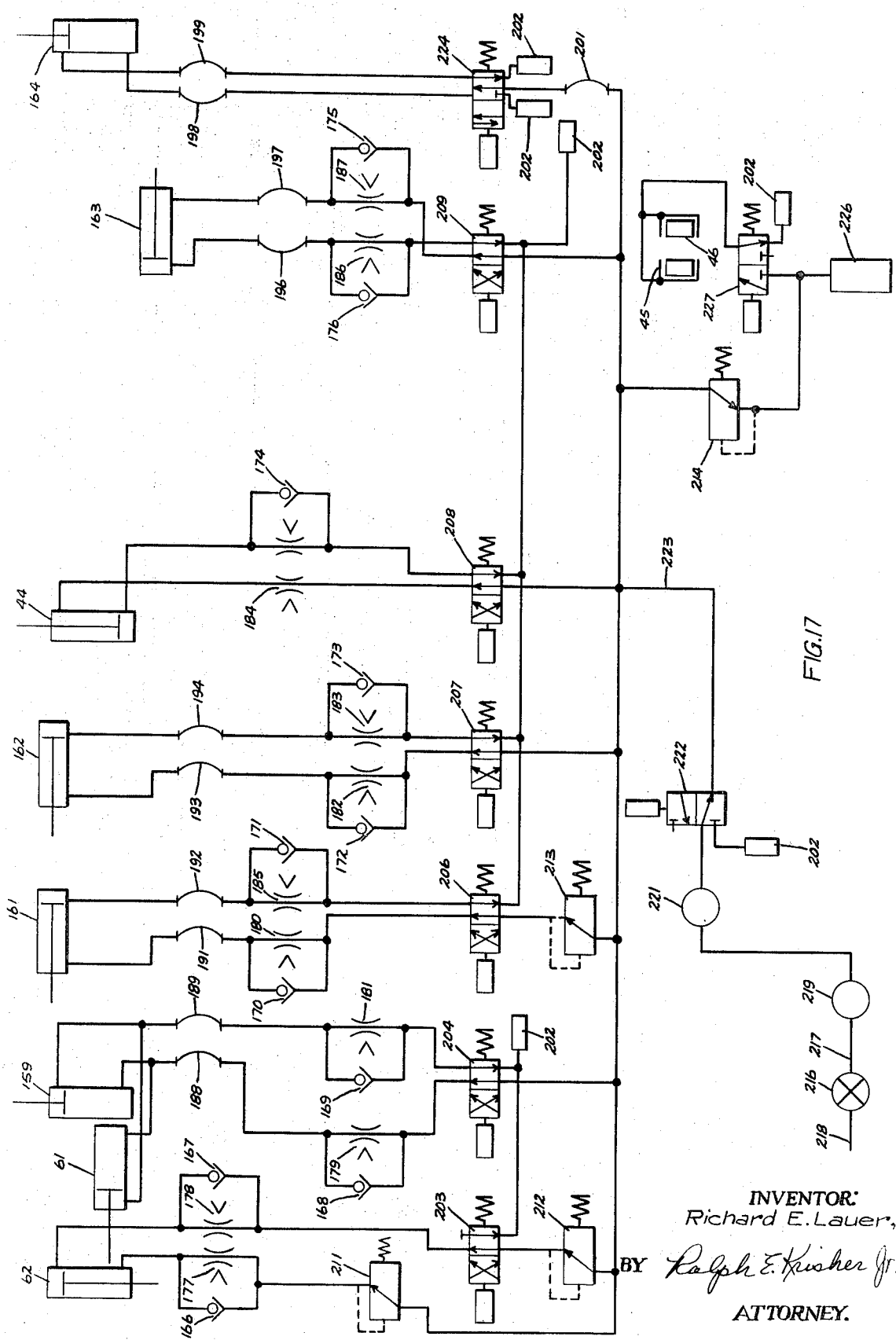
FIG. 17 is a schematic illustration of the pneumatic power and control circuit for the apparatus shown in FIG. 1.

In FIG. 17, reference numerals that were utilized in FIG. 1 have again been utilized to identify the schematically illustrated elements that are also shown pictorially in FIG. 1. Other elements, first appearing in FIG. 17, bear new reference numerals. These elements include various pneumatic cylinders, and starting from the upper left corner of FIG. 17, these cylinders include a fluid motor exemplified as the jump cylinder 62. This cylinder provides means for advancing the coil former 22 into the coil transfer magazine 28 at the desired jump velocity. Cylinder 61 is the jump stripper cylinder that retracts all interposer pins at the end of each machine sub-cycle. Stripper cylinder 159 advances the stripper 69 (described in connection with FIGS. 2 through 4) as the jump stripper cylinder is being operated so that all winding turns are shed from the coil former 22 into the coil transfer magazine 28. Cylinders 161 and 162 operate the wire clamp and wire cut off mechanism respectively, whereas cylinder 44 positions the magazine 28, pedestal 41, and base 35 of FIG. 1. The index of magazine 28 to receive succeeding coil groups is accomplished by means of cylinder 163; and the magazine 28 is locked in place on the pedestal 41 by means of the cylinder 164.

Since numerous other elements in FIG. 17 are substantially identical and are represented by standard schematic symbols, they will be first briefly identified prior to discussing the operational sequence of the FIG. 17 circuit. It should however, first be understood that whenever a FIG. 17 element is referred to as variable, it will be a standard control component provided with means such as a hand valve for manually adjusting the component during initial set up of the apparatus 20.

A plurality of check valves that permit substantially unrestricted fluid flow in one direction but no fluid flow in an opposite direction are denoted by the reference numerals 166–174, 176, and 175. Also shown are a plurality of adjustable needle valves that form variable restrictions and denoted as elements 177–187. Flexible lines are indicated at 188, 189, 191–194, 196–199, and 201. Mufflers, which connect exhaust lines to atmosphere have all been denoted by the single reference numeral 202. Other standard pneumatic control elements include solenoid operated spring return four way valves 203, 204, 206, 207, 208 and 209. Still other elements include adjustable pressure regulator valves 211, 212, 213, 214.

With no air in the system of FIG. 17, the rod of cylinder 62 will be fully extended and the plate 49 will drop down against the interposer pin 51 in FIG. 1. Also, the magazine 28 will be in its lowermost position with the rods of cylinder 44 fully retracted while the rods of wire clamp cylinder 161 and cutoff cylinder 162 will be in whatever position they were in when the air supply to the apparatus was interrupted. Since the stripper 69 is spring biased to an inoperative position, the rod of cylinder 159 will be fully extended, as will be the rod of jump stripper cylinder 61 (the interposer pins also being spring biased to an extended position). The rod of index cylinder 163 will be retracted under the weight of an overriding clutch and other mechanism interconnecting the cylinder rod with the magazine indexing structure. Similarly, the weight of the magazine will have caused retraction of the rod for cylinder 44. The rod of magazine clamp cylinder 164 however is extended due to a spring biased force exerted thereagainst by the magazine locking structure.

At the beginning of operation of the apparatus 20, a manual shut off valve 216 is opened and a main supply 218 of a source of air at approximately 80 psi (all reference hereinafter being to a gauge pressure) opened to line 217. The air passes through a filter 219 and lubricator 221 to a manually operated three way valve 222 which may be utilized to vent or bleed the FIG. 17 system to atmosphere or to connect the system supply line 223 to the 80 psi fluid source.

With 80 psi of air in the lines of the system, the pressure regulator valve 212 will supply 60 psi air to one end of cylinder 62 and this tends to lower the coil former 22 as viewed in FIG. 1. However, the former 22 is actually urged downwardly only by a pressure differential of 20 psi because pressure regulator valve 211 supplies 40 psi of air to the opposite end of cylinder 62. With this arrangement, the jump velocity of the former 22 may readily be controlled and is also consistent from one jump to another. For example, if valve 211 were replaced by a vent to atmosphere, the piston of cylinder 62 would tend to jump under a 60 psi head as soon as an interposer pin was retracted. This in turn can result in undesirably high accelerations and associated inertial forces. Since the acceleration of the former 22 and associated structure is governed by the engineering relationship: $F = MA$; where M equals the mass of the parts to be moved, A equals the acceleration, and F equals the force applied to the parts, it will be understood that the provision of a back pressure, (e.g., with pressure regulator 211) will reduce the magnitude of the force F applied to the mass of the former and related structure. Accordingly, the acceleration and velocity of the former during a jump may be readily controlled. It should be understood that this advantageous arrangement may be utilized for low as well as high winding speeds.

Still referring to FIG. 17, the pistons of the cylinders 61 and 159 extend due to the supply of air pressure thereto through valve 204 and valves 168, 169. The rod of cylinder 161 however will be retracted with 60 pounds of pressure supplied thereto from pressure regulating valve 213 through valve 206. In this position, wire disposed in the wire clamp will be clamped and held in place. Also, cylinder 162 will be retracted and a wire segment in the path of the cut off mechanism will be severed. The piston of cylinder 44 will also be retracted, so the magazine 28 will be in the lowered position as shown in FIG. 1, while the piston of index cylinder 163 will be retracted and the piston of cylinder 164 will be extended.

Any suitable electrical or other logic circuitry is utilized, during operation of the apparatus 20, to operate the valves 203, 204, 206, 207, 208 and 209 to effect the sequence of machine operation discussed at the beginning of this specification, as will be understood.

The control circuitry for the magazine clamp cylinder and brakes 45, 46 are shown in the right-hand portion of FIG. 17. With regard to the magazine clamp cylinder 164, a five port, four way, foot operated valve 224 is utilized to supply line pressure to the cylinder 164 whenever it is desired to remove or place a coil transfer magazine 28 on the pedestal 41. With respect to the brake system, air is supplied through the pressure regulating valve 214 (set at about line pressure) so that air at about supply pressure is supplied to the accumulator 226 and from there to a three way solenoid operated spring return valve 227. Then, at the desired times during an operation sequence of the apparatus of FIG. 1 the valve 227 is actuated by the logic system of the apparatus and air is supplied to the disc brakes 45, 46 to slow or stop the flyer.

From the foregoing it will now be understood that means are provided whereby the speed and acceleration of the former 22 during a jump or advance relative to the flyer may be readily controlled and will be consistent in practice. Moreover, this movement is not now restricted to the short time interval in which the flyer passes through a fraction of a revolution. More particularly, the time period required for the former 22 to accelerate to a desired velocity may occur while the final portion of a first coil is being developed. Then, after a relatively constant velocity is attained by the former 22, an intercoil winding segment is generated with a lead as discussed in connection with FIG. 12. Although a lead is preferable, the transition regions also assure proper placement of an intercoil winding segment.

After this segment is placed, the former 23 will decelerate while the initial portion of a succeeding coil is being developed and then dwell while additional winding turns for such succeeding coil are generated.

It will now be appreciated that the practice of my invention in a preferred form or with the exemplified apparatus results in an intercoil winding segment being generated away from the confines of a winding turn receiver. As earlier mentioned, the jump speed may vary from a speed slightly greater than the winding turn feed rate to a velocity of about 800 inches per minute, this upper limit being determined by the inertial forces (i.e., MA) of existing equipment designs of which I am aware.

From the preceding, it will now be seen that the present invention overcomes problems associated with prior approaches and provides an improved method and apparatus for rapidly and efficiently developing coil groups having at least two differently sized coils. Moreover, the teachings hereof may be utilized with equipment and processes other than the particular types illustrated in the drawings and described herein. For example, horizontal rather than vertical equipment may be operated to advantage while utilizing the invention. Furthermore, the invention may be utilized in connection with the development of coils that are received by various coil receiving means including coil injection tooling, as well as other types of coil turn receivers as will be understood.

For example, the advantages of the invention may be realized in apparatus of the type wherein coils are developed and retained on the winding turn former and then subsequently removed therefrom by a plurality of pins or blades. In this type of equipment, misplacement of an intercoil winding segment would normally not result in broken windings, since the situation represented by winding outlines 136, 137 in FIG. 9 could not occur during winding. However, a wire following the path of dotted wire turn 137 in FIG. 9 would be placed about the middle turn former section and block the subsequent movement of a pin or blade between the sections 71, 72. Thus, even with the type of apparatus here discussed, proper placement of intercoil winding turns is important. Of course, reduced inertial forces would also be benficial with this type of equipment.

In an earlier portion of this disclosure, reference was made to the dimensions H and Q of FIG. 5. Desirably, both of these dimensions are at least large enough to accommodate the maximum size wire to be wound.

In the case of the length H of ledge 115, if a winding turn were to overhang the edge, it could become misplaced therefrom prematurely and interfere with subsequent movement of a winding receiver, particularly under low winding tensions when relatively loose winding turns may be encountered.

In the case of the dimension Q, it should first be noted that, as the pins such as pins 126–128 of FIG. 9 advance relative to the former 22 during a jump, the opening between the pins and ledge 115 tends to close. If Q were relatively small and the wire of the winding had a diameter signficantly larger than Q, the intercoil winding segment would lie in the path of one of the pins during the jump and possibly result in breakage of such segment.

As a final consideration, it should also be noted that the tension of the generated winding turns can tend to retain the former in a raised position. Accordingly, this resistance should also be considered in establishing the force applied to the former 22 during a jump and particularly so in horizontal winding applications where the force of gravity would not tend to counteract the winding tension force as in the case of apparatus 20. This would also be true even where the former advancing means comprises a powered lead screw rather than the illustrated fluid cylinder.

Therefore, while in accordance with the Patent Statutes, I have described what at present is considered to be the preferred embodiments of my invention, it will be obvious to those skilled in the art that numerous changes and modifications may be made therein without departing from the invention. It is therefore aimed in the appended claims to cover all such equivalent variations as fall within the true spirit and scope of the invention.

What I claim as new and desire to secure by Letters Patent of the United States is:

1. A method of developing at least first and second differently sized coils connected together by an intercoil winding segment, the method comprising the steps of: generating a predetermined number of winding turns, each being of generally the same first size, at a first nominal winding turn rate with adjacent winding turns being generated in closely spaced relationship; generating a final first coil winding turn at the same nominal winding turn rate, and establishing a lead between at least two adjacent turns of the final portion of the first coil; forming an intercoil winding segment at the same nominal winding turn rate, and establishing a lead between at least part of the final first coil winding turn and the intercoil winding segment; generating an initial winding turn of a second coil at the same nominal winding turn rate, and establishing a lead between at least part of the initial winding turn of the second coil and the intercoil winding segment; and generating the remainder of a predetermined number of second coil winding turns, with at least some of the winding turns in the second coil being disposed in closely spaced relationship.

2. The method of claim 1 wherein establishing a lead between at least two adjacent turns of the final portion of the first coil comprises effecting a relative acceleration between a first one of said two adjacent turns in a predetermined direction and the second one of said two adjacent turns while generating the second one of said two adjacent turns.

3. The method of claim 1 wherein establishing a lead between at least part of the final first coil winding turn and the intercoil winding segment comprises effecting relative movement between the at least part of the final first coil winding turn and the intercoil winding segment as it is being generated.

4. A method of developing at least two differently sized coils connected together by an intercoil winding segment, the method comprising the steps of: effecting relative rotation at a predetermined speed between at least two members of a winding generating assembly about a longitudinal axis of rotation and generating a predetermined number of winding turns for a first coil at a given winding turn feed rate while holding the at least two members in fixed longitudinal relationship; longitudinally accelerating one of the at least two members relative to the other to establish a relative velocity therebetween in excess of the given winding turn feed rate and generating at least part of a final winding turn of the first coil; generating an intercoil winding segment and at least part of an initial winding turn of the second coil at the predetermined speed while continuing to longitudinally advance the one of the at least two members relative to the other at a speed that is at least equal to the established relative velocity; forming at least part of an additional winding turn of the second coil while longitudinally decelerating the one of the at least two members relative to the other; and generating the balance of a predetermined number of winding turns for the second coil.

5. The method of claim 4 including the step of moving at least the initial turn of the first coil into a coil receiving means prior to generating the final turn of the first coil.

6. The method of claim 4 wherein continuing to longitudinally advance the one of the at least two members relative to the other comprises advancing the one of the at least two members at a velocity in the range of 80 inches per minute to 800 inches per minute relative to the other of the at least two members.

7. A method of developing, about an axis, at least two differently configured coils connected together by an intercoil winding segment, the method comprising the steps of: generating a predetermined number of initial winding turns for a first coil; generating the final portion of the first coil while establishing a relative axial velocity between at least some of the said predetermined number of initial winding turns and the final portion of the first coil; forming an intercoil winding segment while at least maintaining a relative axial velocity between the final portion of the first coil and the intercoil winding segment being generated; generating at least one winding turn of a second coil while maintaining a relative axial velocity between the intercoil winding segment and the at least one winding turn being generated; and generating the balance of the winding turns of the second coil.

8. The method of claim 7 including means at least a portion of one of the winding turns of the first coil into a winding turn receiving means while establishing the relative axial velocity between said predetermined number of initial winding turns and the final portion of the first coil.

9. The method of claim 7 wherein generating the final portion of the first coil, forming an intercoil winding segment, and generating at least one winding turn of a second coil comprises generating turns of winding material at a relatively uniform winding turn generation rate.

10. Apparatus for developing at least two different coils each having a plurality of winding turns with the coils being interconnected by an intercoil winding segment, the apparatus comprising: a winding turn generating assembly including a turn former comprising at least first and second sections; the first and second sections each having at least two adjacent longitudinally extending stages formed thereon with the adjacent stage of each of the first and second sections being separated respectively by a transition region; each of the longitudinally extending stages including a winding turn formation region; the longitudinal distance between the winding turn formation region of a first stage and the next adjacent stage of the first turn former section being greater than the longitudinal distance between the winding turn formation region of a corresponding first stage and next adjacent stage of the second turn former section; the transition region separating the first and next adjacent stage of the first turn former section comprising a generally longitudinally extending winding turn accommodating step positioned laterally between said first and next adjacent stage of the first former section thereby to provide means for accommodating at least a portion of an intercoil winding segment arranged to extend between first and second coils of a coil group.

11. The apparatus of claim 10 wherein the winding turn generating assembly includes means for disposing winding turns about the turn former, said means for disposing and said turn former being supported for relative rotation at a predetermined speed about a longitudinal axis, the apparatus further comprising means for establishing a relative longitudinal velocity between the former and means for disposing while the means for disposing is longitudinally aligned with a winding turn formation region of a given first stage of the former and for moving the disposing means and a winding turn formation region of another stage of the former next adjacent to said first given stage into relative longitudinal alignment thereby to permit the disposing means and former to lead an intercoil winding segment longitudinally past the transition stage between said given first stage and said another stage.

12. The apparatus of claim 10 wherein the winding turn generating assembly includes means for disposing winding turns about the turn former at a predetermined turn formation rate and the apparatus further comprises means for effecting relative longitudinal movement between the turn former and means for disposing during the time that at least two winding turns are being disposed about the turn former thereby to permit the generation of an intercoil winding segment across a transition region of the first section of the turn former.

13. A machine for developing at least two interconnected wound coils, each coil comprising a predetermined number of winding turns, said machine comprising: a turn former including at least two sections each having a plurality of turn forming stages, the adjacent stages of one of the sections being separated by a transition region extending from one stage to another and including a wire accommodating ledge located laterally between two adjacent stages and having a predetermined longitudinal extent; a wire-placing means; means for causing a first mode of relative movement between said wire-placing means and said turn former to place winding turns of wire about said turn former and to generate winding turns at a given winding turn rate; and means for intermittently causing a second mode of relative movement between said wire-placing means and said turn former to sequentially locate a winding turn formation region of at least two coil-forming stages of the turn former in a winding turn receiving position; said means for intermittently causing a second mode of relative movement effecting such movement at a velocity in excess of the winding turn feed rate to provide at least a portion of the final turn of a first coil and at least a portion of an intercoil winding segment connected thereto along a transition region between two adjacent stages of said one of the sections of the turn former.

14. The machine of claim 13 wherein the machine further comprises a winding turn receiving means having gap defining members, said gap defining members being movable into proximity with at least one of the former sections thereby to facilitate movement of winding turns from the turn former to the turn receiving means.

15. The machine of claim 13 wherein the second mode of relative movement is effected at a velocity of less than 800 inches per mintue.

16. The machine of claim 13 wherein the predetermined longitudinal extent of the wire accommodating step of said transition region is greater than the cross-sectional dimension of wire to be accommodated thereby as measured along the direction line of the second mode of relative movement.

17. Apparatus for developing at least two interconnected wound coils, each coil comprising a predetermined number of winding turns, said apparatus comprising: a turn former having a plurality of turn forming stages; a wire-placing means for disposing turns of a first coil, an intercoil winding segment, and turns of a second coil relative to the turn former; means, including at least one fluid pressure responsive device, for holding the turn former and means for disposing in substantially fixed longitudinal alignment while the turns of an initial part of a first coil and at least some turns of a second coil are generated, and for effecting relative longitudinal movement between the turn former and means for disposing at a preselected speed while at least a portion of a final turn of a first coil, an intercoil winding segment, and at least an initial turn portion of a second coil are generated so that a lead is established between the at least a portion of a final turn, the intercoil winding segment, and the initial turn portion of the second coil; and means for controlling the operation of the fluid responsive device including pressure regulating means arranged to establish a fluid pressure differential for operating the fluid pressure responsive device, so that the speed of the relative longitudinal movement between the turn former and means for desposing, during formation of at least the intercoil winding segment, may be preselectively controlled.

18. The apparatus of claim 17 wherein the turn former includes a transition region extending between two forming stages, the transition region comprising a longitudinally extending wire accommodating surface.

19. The apparatus of claim 17 further including coil receiving means, at least a portion of said turn former and coil receiving means being movable relative to one another during operation of the apparatus, said former including at least one transition region comprising a longitudinally extending wire accommodating surface thereby to assist in accurate generation of an intercoil winding segment at high winding turn generation speeds.

* * * * *